United States Patent [19]

Motoi et al.

[11] Patent Number: 4,891,502

[45] Date of Patent: Jan. 2, 1990

[54] CASH DISPENSER OF THE TYPE TRANSPORTING A SLIP AND BILLS TOGETHER

[75] Inventors: Nobuhiro Motoi; Yoshinori Koshida; Isao Miyake; Yasuo Okazaki, all of Tokyo, Japan

[73] Assignee: Oki Electric Industry Co., Ltd., Tokyo, Japan

[21] Appl. No.: 255,268

[22] Filed: Oct. 11, 1988

[30] Foreign Application Priority Data

Oct. 12, 1987 [JP] Japan ................................ 62-254717

Nov. 2, 1987 [JP] Japan ........................... 62-166814[U]

[51] Int. Cl.[4] ............................................. G06F 15/30

[52] U.S. Cl. ..................................... 235/379; 235/381

[58] Field of Search ................................ 235/379, 381

[56] References Cited

U.S. PATENT DOCUMENTS 4,747,493 5/1988 Nakanishi ............................ 235/379

*Primary Examiner*—Harold I. Pitts

*Attorney, Agent, or Firm*—Wenderoth, Lind & Ponack

[57] ABSTRACT

A cash dispenser operated by a customer to feed bills out of a safe, then stack the bills in a temporary-stacking section, and presents the bills together with a slip which is printed with particulars of an account to the customer. The temporary-stacking section includes a first stage for stacking the bills and a second stage located above the first stage for receiving the slip. The printed slip is transferred to the second stage from one side of and at an angle of substantially 90 degrees relative to the second stage by a transferring section. A bundle transporting section includes lower transport belts interposed between a bill outlet of the dispenser and the temporary-stacking section, and upper transport belts movable in a rotational motion relative to the lower transport belts. The bills and slip are piled up on the temporary-stacking section and then driven toward the bill outlet of the dispenser by the upper and lower transport belts. The slip is fed from a printing unit directly onto the top of bills which are piled up in a horizontal position in the same manner as during the transfer.

8 Claims, 9 Drawing Sheets

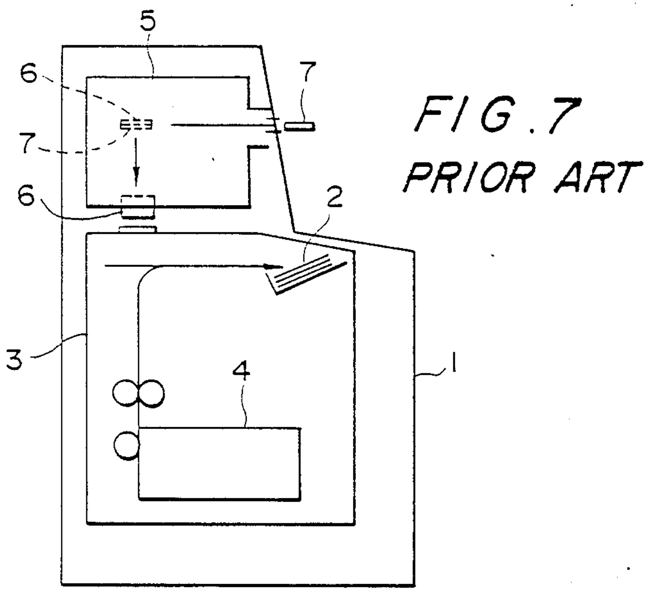
FIG. 7
PRIOR ART
FIG. 8
PRIOR ART
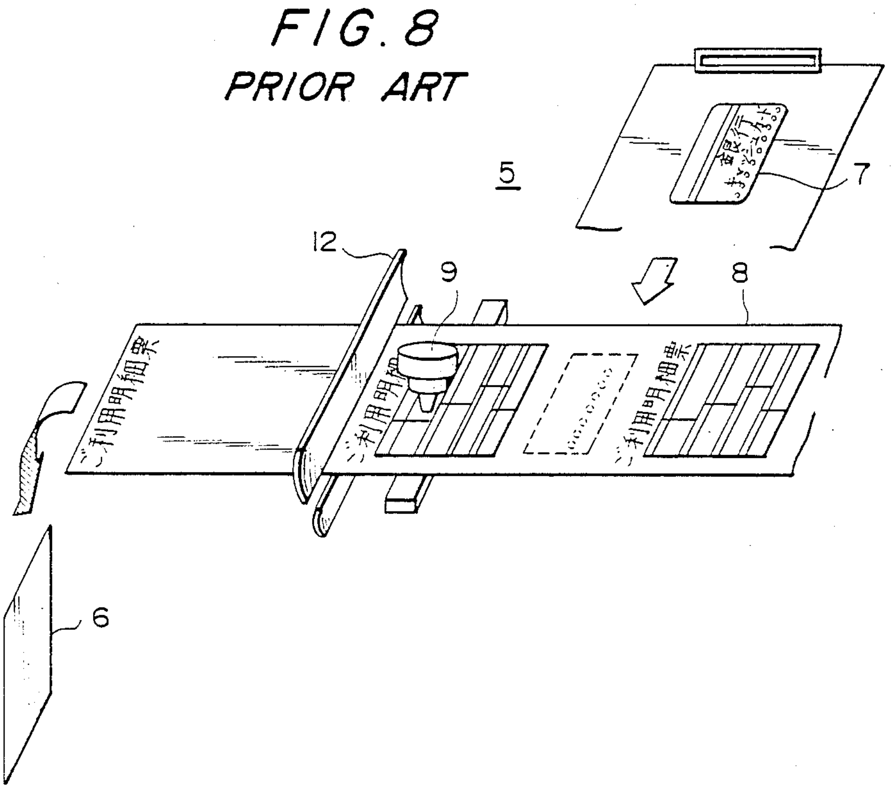

CASH DISPENSER OF THE TYPE TRANSPORTING A SLIP AND BILLS TOGETHER

BACKGROUND OF THE INVENTION

1. Field of the Invention

The present invention relates to a cash dispenser which may be installed in a bank or similar monetary facility for automatically dispensing bills in response to customer's operations.

2. Description of the Prior Art

A cash dispenser is constructed such that, when a customer inserts an identification card into the dispenser and then performs a sequence of necessary operations, the dispenser releases a certain amount of bills as demanded by the customer, as well known in the art. At the instant when the dispenser produces bills as stated, it prints out particular of the account on a slip and ejects such a slip together with the bills.

FIG. 7 is a schematic side elevation showing a prior art cash dispenser of the type described. As shown, the prior art cash dispenser includes a housing 1 which is provided with a bill outlet 2 at its front. A disbursing mechanism 3 is installed in the housing 1 to produce bills from a safe 4 and transports them to the outlet 2, so that a customer who has demanded the payment may receive the bills. Also installed in the housing 1 is a printing unit 5 for printing out the content of an account on a slip 6. More specifically, as a customer manipulates an operation board, not shown, for entering a command for payment, then inserts an identification card 7 into the dispenser, and then inputs a desired amount of money, the dispenser starts operations for releasing bills. The customer's card 7 inserted into the dispenser as shown in the figure is transported to a position below a slip 6 to be imprinted with the indications of the card 7, and then such slip is printed with particulars of the account by the printing unit 5 and then is changed in direction to be advance toward the disbursing mechanism 3 as indicated by an arrow in the figure.

Details of the printing unit 5 are shown in a perspective view in FIG. 8 and in a side elevation in FIG. 9. As shown in FIG. 8, the printing unit 5 issues the slip 6 by the steps of driving the identification card 7 inserted into the dispenser to a position immediately below a slip sheet 8 which is in the form of a continuous webbing and pressing the sheet 8 against the card 7 by adequate means, not shown, to imprint indications of the card 7 on the sheet 8. Subsequently, a printer 9 of the printing unit 5 is operated to print out the content of the account on the resulting slip 6. A journal sheet 10 also in continuous form is taken up by a take-up mechanism 11 while, at the same time, the slip 6 is cut by a cutter 12 and transported toward the disbursing mechanism 3 in a direction indicated by arrows in the figures.

FIG. 10 shows in side elevation a disbursing structure of the mechanism 3 together with a structure for feeding the slip 6 out of the printing unit 5. Such structures are shown in a front view in FIG. 11. The slip 6 turned upside down by reversing means, not shown, within the printing unit 5 is fed into the disbursing mechanism 3 by a pair of slip rollers 13 face down. Such face-down feed of the slip 6 is adopted so that the slip 6 may be positioned face up when later turned over by a stacking wheel 14. The slip 6 drawn into a receiving section 13a of the mechanism 3 by the slip rollers 13 is fed onto a slip guide 15 by a pair of clamp rollers 16 and 17 in a direction perpendicular to the direction in which the slip 6 has been fed from the printing unit 5. Then, the slip 6 is further driven by coactive belts 18 and 19 and laid on the top of bills 20 face up by the stacking wheel 14, the bills 20 being piled up by the stacking wheel 14 beforehand.

FIG. 12 shows another prior art cash dispenser in a schematic front view. This prior art cash dispenser includes a belt 21, a roller 22 and a sensor 23 in addition to the various structural parts and elements of the previously discussed prior art cash dispenser. Specifically, the slip 6 is not only driven by the rollers 13 but also held between the belt 21 and the roller 22. After the slip 6 has been sensed by the sensor 23, it is further driven by a particular distance associated with a predetermined number of pulses and then brought to a halt. In this condition, the belt 21 is raised and the slip 6 is transported by the clamp rollers 18 and 19 onto a slip guide 24 in a direction perpendicular to the direction in which the slip 6 has been introduced into the mechanism 3. Subsequently, the slip 6 is conveyed in the same manner as in the prior art arrangement of FIG. 10 so as to be laid on a stack of bills.

The prior art cash dispenser shown in FIG. 10 which relies on the rollers 13 for feeding the slip 6 toward the slip guide 15 suffers from various drawbacks. Specifically, the slip 6 is apt to fail to reach a bent surface of the slip guide 15 which serves as a reference surface for the travel of the slip 6 or, if it successfully has reached such surface, it is apt to spring back. Further, while the slip 6 is driven by the clamp rollers 16 and 17 in a direction perpendicular to the direction in which it has been fed to reach the bill outlet via the slip guide 15, it is often caught by the slip guide 15. In addition, the clamp rollers 16 and 17 have to be driven or by exclusive or separate drive mechanism which includes pulleys and belts, resulting in a bulky and expensive cash dispenser.

A problem with the prior art arrangement shown in FIG. 12 is that the slip 6 cannot be brought to a halt at a reference surface unless an extra motor control is provided for driving the slip 6 by for a distance accurately associated with a predetermined number of pulses after the sensor 23 has sensed the slip. This, coupled with the need for a belt-and-roller drive mechanism, increases the size and cost of the cash dispenser.

The transport path extending between the printing unit 5 and the stacking section of the disbursing mechanism 3 is basically adapted for bills and not for a slip. Since bills are transported at an extremely high speed for purposes of rapid processing, a slip cannot be redirected with ease and is therefore apt to be caught by the guide to jam the path.

The stacking wheel 14 included in both of the prior art cash dispensers as shown and described turns over the slip 6 when laying it on the top of a stack of bills. Hence, in order that the slip 6 may be presented face up to a customer, it has to be turned face down beforehand by a preliminary step. This not only adds to the overall dimensions of the cash dispenser but also complicates the transport path. Furthermore, since bills and slips are different from each other with respect to weight and flexibility, a bill often fails to enter the stacking wheel to thereby jam the transport path or to drop into a lower part of the cash dispenser. Such occurrence results in the cash dispenser being shut down, thus interrupting the transactions at the monetary facility.

A cash dispenser or similar apparatus which handles sheets includes a mechanism for transferring sheets such as bills from one location to another location. With this kind of apparatus, it has been customary to trnasport a sheet by transferring means which holds the sheet at two or more points to prevent it from rotating or deviating relative to a transport path. The sheet is driven into a receiving section in which a guide or similar member for regulating the rise of a sheet away from the receiving section is disposed.

Regarding this aspect, the prior art arrangement of FIG. 10 fails to transfer or discharge a sheet as far as a predetermined position in the receiving section or causes a sheet to yield due to the force of a roller after it has reached the predetermined position, because a roller is used to drive a sheet into the receiving section. Such a sheet would cause a jam and other various trou-. bles during a subsequent operation or procedure. Moreover, when a slip or similar thin sheet is discharged in a single plane, it hangs down as shown in FIG. 13 or springs up during discharge and, therefore, the direction of flight of the sheet cannot be regulated with ease, further aggravating the chance of jamming.

The prior art cash dispenser shown in FIG. 12 has a shortcoming that the freedom of subsequent processing is limited due to the inherent arrangement of the regulating member and other elements.

SUMMARY OF THE INVENTION

It is therefore an object of the present invention to provide a cash dispenser which minimizes difficulties in the transport of sheets and, yet, has a small size.

A cash dispenser for dispensing bills in response to customer's operations according to the present invention includes a disbursing mechanism provided with a bill outlet for producing bills from the cash dispenser. Temporary-stacking means installed in the mechanism temporarily stacks bills to be dispensed and places on top of the bills a slip which is printed with particulars of an account. The temporary-stacking means consists of a first stage for stacking bills and a second stage located above the first stage for supporting and placing a slip. Transferring means delivers the recorded slip onto the second stage from one side of and at an angle of substantially 90 degrees relative to the second stage. Bundle transporting means consists of lower transport belts interposed between the bill outlet and the temporary-stacking means and upper transport belts movable in a rotational motion relative to the lower transport belt. In this construction, the bills and the slip are stacked on the temporary-stacking means and then transported to the bill outlet while being held between the lower and upper transport belts.

In accordance with the present invention, feeding means feeds bills one by one out of a safe in a response to customer's operations. A discriminating section discriminates those bills with respect to type, checks the bills for defects, and counts normal bills. Defective bills are collected into a reject safe while normal bills to be dispensed are stacked in the temporary-stacking section for a short time. When bills associated with the desired amount of money are fully stacked in the temporary-stacking section, a slip printed with particulars of the account is fed by transferring means to the second stage of the temporary-stacking section. Then, the bills and slip are transported together to the bill outlet while being held between upper and lower transport belts of bundle transporting means.

In a preferred embodiment of the present invention, the transferring means includes transporting means disposed on a center line of the transferring means with respect to an intended transferring direction. The transporting means includes belts and rollers for supporting the belts. The belts and rollers cooperate to transfer the slip onto the second stage at a discharging end of the transporting means while holding the slip. The transporting means is provided with guide members at both sides of the discharging end for deforming the slip generally into the form of a letter U.

In accordance with the present invention, a sheet is retained and transported by transporting means toward a discharging end. The sheet is deformed generally into the form of a letter U at the moment of discharge by the force of the transporting means, which is located on the center line with respect to an intended direction of transfer, and guide members. Hence, the sheet is caused to move to a predetermined position with accuracy.

BRIEF DESCRIPTION OF THE DRAWINGS

The objects and features of the present invention will become more apparent from a consideration of the following detailed description taken in conjunction with the accompanying drawings in which:

FIG. 7 is a schematic side elevation showing a prior art cash dispenser;

FIG. 8 is a perspective view schematically showing a part of a printing unit which is included in the prior art cash dispenser of FIG. 7;

DESCRIPTION OF THE PREFERRED EMBODIMENTS

Figure 1:
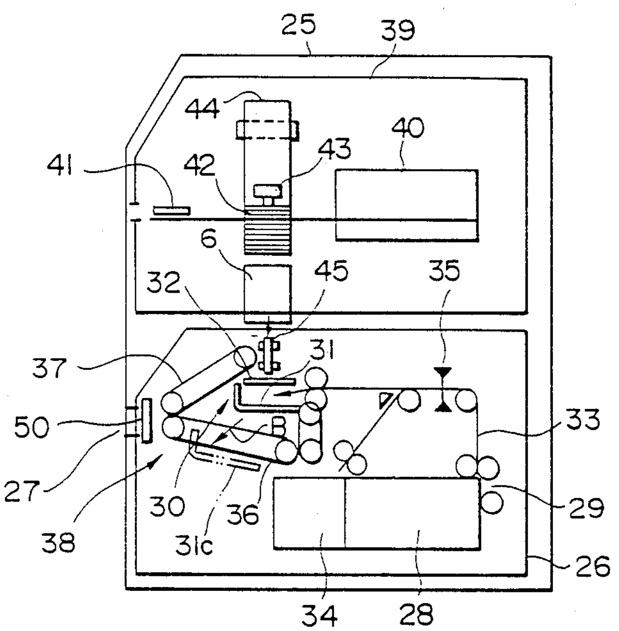
FIG. 1 is a schematic side elevation showing a cash dispenser embodying the present invention.

Referring to FIG. 1 of the drawings, one embodiment of a cash dispenser in accordance with the present invention is shown and includes a housing 25. The housing 25 accommodates a disbursing mechanism 26 therein. The disbursing mechanism 26 is provided with a bill outlet 27 for producing bills. A safe 28 stores bills thereinside and is securely mounted in the mechanism 26. The bills are fed one by one out of the safe 28 by feeding means 29. A temporary-stacking section 30 stacks for a moment bills 20, FIG. 5, which are sequentially delivered thereto from the safe 26 to be handed over to a customer. The temporary-stacking section 30 also serves to lay on the stack of bills 20 a slip 6 on which the particulars of an account have been printed. The temporary-stacking section 30 has a two-story structure, i.e., it consists of a first stage 31 for piling up the bills 20 thereon and a second stage 32 disposed above the first stage 31 for collecting the slip 6 thereon.

In the disbursing mechanism 26, a transport path 33 for transporting bills 20 extends between the temporary-stacking section 30 and the feeding means 29. Bills or similar sheets which are defective and therefore should not be dispensed are collected in a reject safe 34. A discriminating section 35 is disposed on the transport path 33 between the temporary-stacking section 30 and the feeding means 29 in order to discriminate bills fed by the feeding means 29 out of the safe 26 with respect to kind, to identify defective bills, and to count normal bills. Parallel lower transport belts 36 are located between the outlet 27 and the reject safe 34 while upper transport belts 37 are located above the lower transport belts 36, the upper belts 37 being movable toward and away from the lower belts 36 in a rotational motion. The upper and lower transport belts 37 and 36, respectively, cooperate to constitute bundle transporting means 38. Having a bidirectional transporting function, the bundle transporting means 38 also serves to define a return transport path. More specifically, when bills 20 and a slip 6 once presented together through the outlet 27 are left unremoved, the bundle transporting means 38 is driven in the reverse direction to collect them into the reject safe 34.

Also accommodated in the housing 25 of the cash dispenser is a printing unit 39 for printing out various data associated with an account on the slip 6. The printing unit 39 includes a card reader/writer 40 for reading customer identification data, account data and other data out of a card 41 and for writing predetermined data. A slip is formed from a slip sheet 42 in the form of a continuous blank or non-printed webbing and a journal sheet also in the form of a continuous webbing for preserving account records. A slip printer 43 includes a print head for printing data on the slip webbing 42 and a mechanism for driving the print head. The journal webbing is taken up by a takek-up section 44 after data have been printed on the webbing 42. Transferring means 45 is provided in the printing unit 39 for delivering a printed slip 6 onto the second stage 32 from one side of and at an angle of substantially 90 degrees relative to the second stage 32.

Reference will be made to FIGS. 2 to 6 for describing in detail the constructions of the transferring means 45, temporary-stacking section 30 and bundle transporting means 38.

The first stage 31 of the temporary-stacking section 30 is constituted by a pair of parallel elongate plates 31a and 31b which are spaced by a predetermined distance from each other. While the bundle transporting means 38 is in operation, the first stage 31 is retracted by a cam mechanism, not shown, to a position 31c which is indicated by a dash-and-dots lines in FIG. 4.

Figure 2:
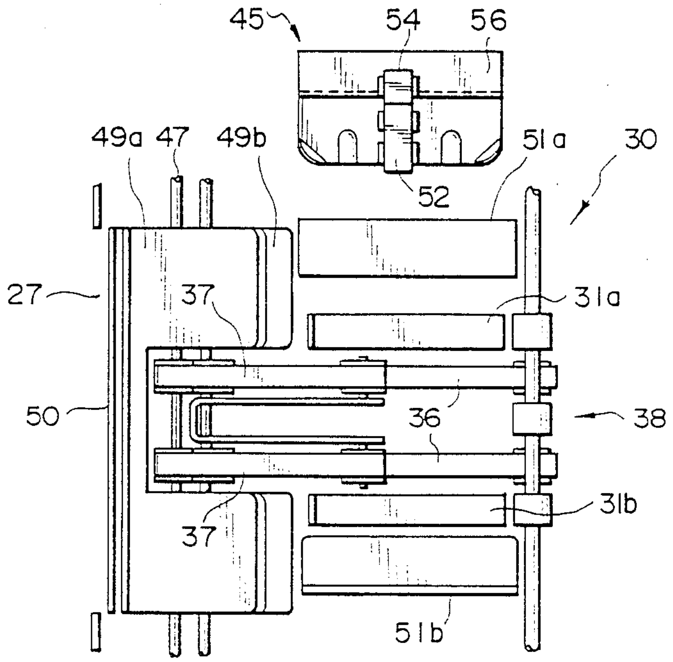
FIG. 2 is a fragmentary plan view of the cash dispenser shown in FIG. 1.
Figure 3:
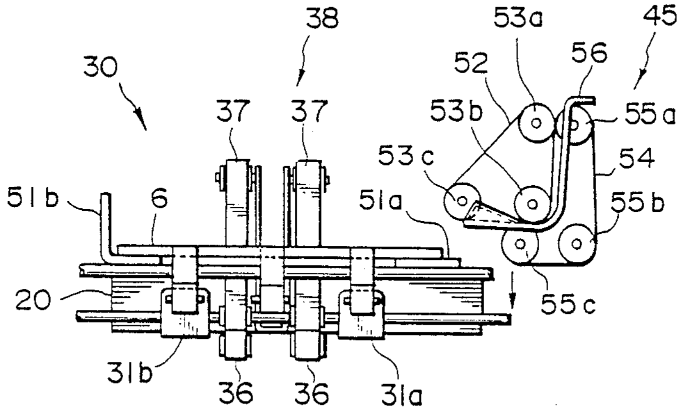
FIG. 3 is a fragmentary front view of the embodiment shown in FIG. 2.

As shown in FIG. 2, the bundle transporting means 38 is interposed between the parallel plates 31*a* and 31*b* which constitute the first stage 31. It will be clear from FIG. 4 that the upper transport belts 37 are each supported by rollers 46*a* and 46*b* and re rotatable about a pivot 47. The lower transport belts 36 are each supported by rollers 48*a* and 48*b* and are driven by a motor, not shown. An upper guide 49*a* and a lower guide 49*b* extend to the outlet 27 so as to guide the bills 20 and slip 6 being transported toward the outlet 27. A shutter 50 is provided for opening and closing the outlet 27 as needed.

As also shown in FIG. 2, the second stage 32 of the temporary-stacking section 30 is comprised of a pair of parallel elongated plates 51*a* and 51*b* which are securely mounted on a framework of the cash dispenser, not shown. The plates 51*a* and 51*b* are spaced apart by a distance which is greater than the distance between the plates 31a and 31b of the first stage 31 and smaller than the lengthwise dimension of a sheet, i.e. slip, which is handled by the cash dispenser.

Figure 5:
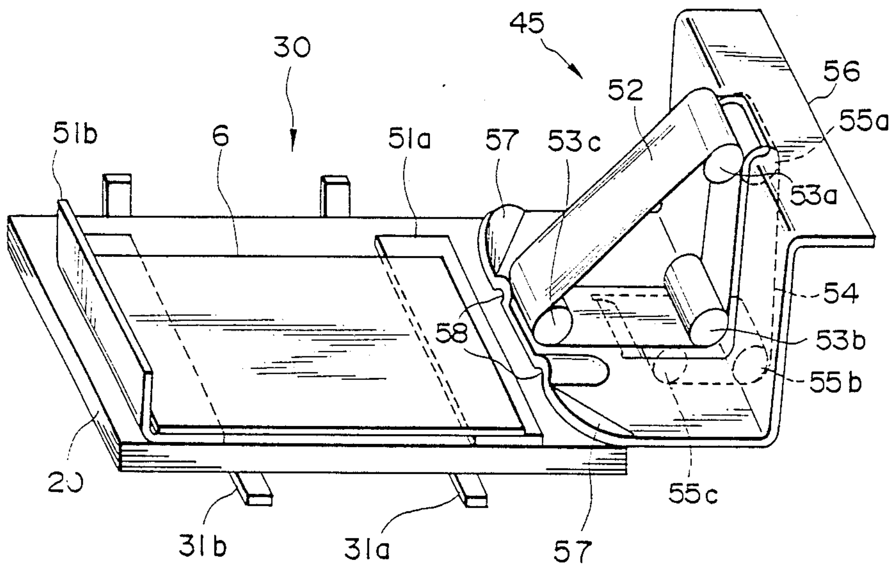
FIG. 5 shows an essential part of such embodiment in a perspective view.
Figure 6:
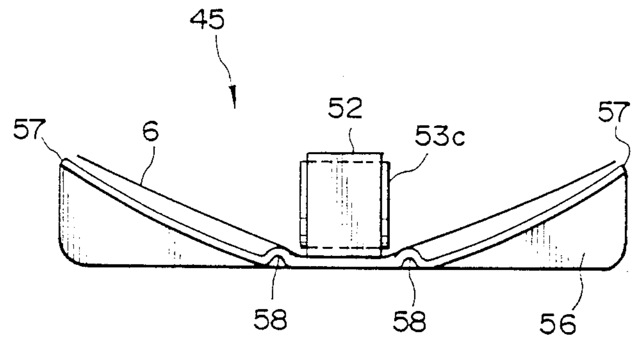
FIG. 6 is a fragmentary front view of such embodiment.
Figure 9:
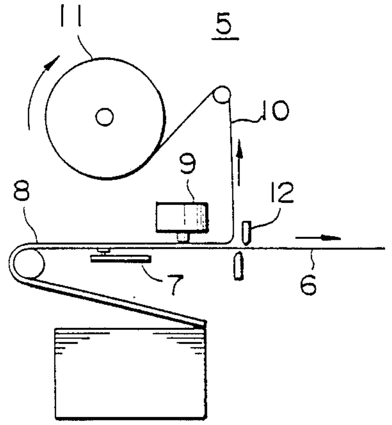
FIG. 9 PRIOR ART
FIG. 9 is a side elevation of the printing unit of the prior art cash dispenser.
Figure 10:
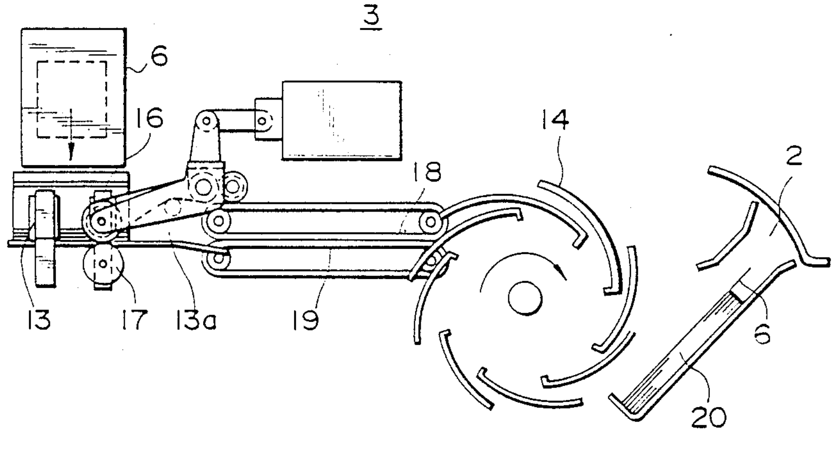
FIG. 10 PRIOR ART
FIG. 10 is a side elevation of a disbursing mechanism which is also included in the prior art cash dispenser.
Figure 11:
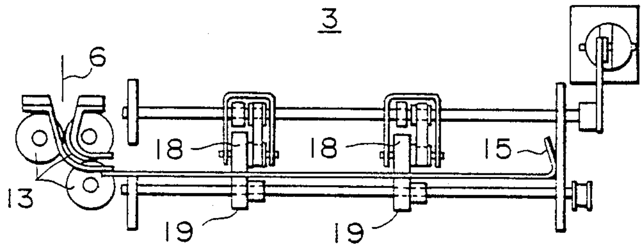
FIG. 11 PRIOR ART
FIG. 11 is a front view of the disbursing mechanism of the prior art cash dispenser.
Figure 12:
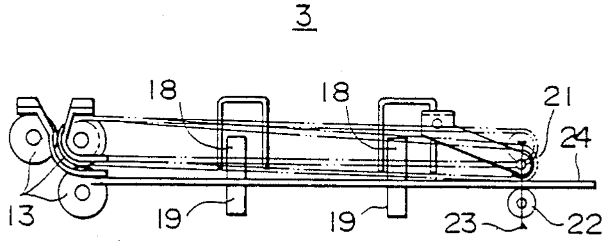
FIG. 12 PRIOR ART
FIG. 12 is a front view similar to FIG. 11, showing a disbursing mechanism of another prior art cash dispenser.
Figure 13:
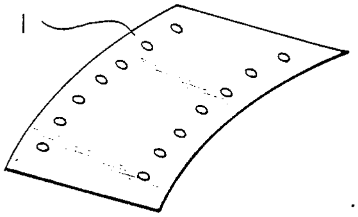
FIG. 13 PRIOR ART
FIG. 13 is a perspective view of an example of a slip which is discharged by the disbursing mechanism of FIG. 10.

The transferring means 45 includes an upper transfer belt 52 which is passed over rollers 53*a*, 53*b* and 53*c* to define a generally L-shaped transfer path, as best shown in FIG. 5. A lower transfer belt 54 is passed over rollers 55*a*, 55*b* and 55*c* and located to face the upper transfer belt 52. The belts 52 and 54, or transporting means 45, are each positioned on the center line of a generally L-shaped guide 56 with respect to an intended direction of slip transfer. Flight guides 57 are formed by bending opposite ends of that edge of the L-shaped guide 56 which immediately precedes a feed-out position. The flight guides 57 and the upper transfer belt 52 serve to bend the slip 6 generally in the form of a letter U in section, promoting accurate transfer of the slip 6 to the second stage 32 due to resilience of the slip. Further, the guide 56 is provided with protuberances 58 at opposite sides of the upper transfer belt 52 so that the slip 6 may be urged by the protuberances 58 against the belt 52 to further promote accurate transfer.

In operation, when a customer enters a payment command on an operation board, not shown, of the cash dispenser and then inserts the card 41, FIG. 1, assigned to the customer, the feeding means 29 feeds bills one by one out of the safe 28. The discriminating section 35 discriminates the bills with respect to their kind, checks the bills for defects, and counts normal bills. Defective bills sensed by the discriminating section 35 and which should not be dispensed are collected in the reject safe 34, and bills without defects are temporarily stacked on the first stage 31.

As soon as the bills 20 of the amount entered on the operation board are piled up in the temporary-stacking section 30, the card 41 inserted into the cash dispenser is transported to below the slip sheet 42 to be imprinted with the indications of the card 41 and then printed with particulars of the payment by the slip printer 39. The journal webbing is taken up by the take-up mechanism which is driven by a motor, not shown, while the resulting slip 6 is driven toward the transferring means 45. In the transferring means 45, the slip 6 is driven by the transporting means toward the second stage 32 of the temporary-stacking section 30 face up while being deformed into a U shape by the guide 56.

Figure 4:
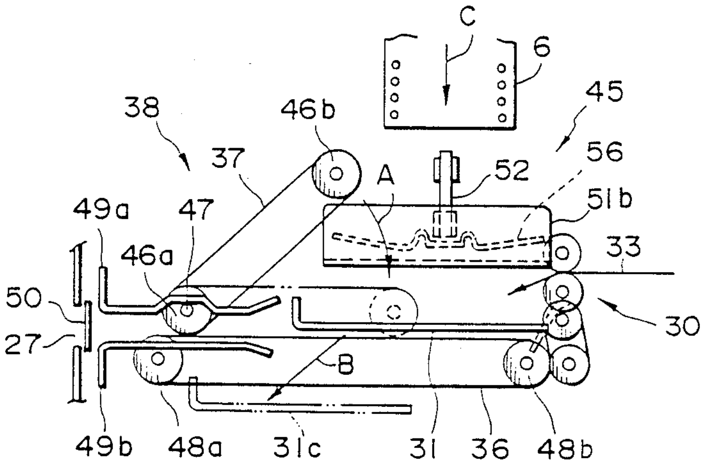
FIG. 4 is a fragmentary side elevation of such embodiment.

Upon the completion of transfer of the slip 6, the upper transport belts 37 of the bundle transporting means 38 are rotated about the pivot 47 by a motor, not shown, in a direction indicated by an arrow A, FIG. 4, until they hold the stack of bills 20 between themselves and the lower transport belts 36. At this instant, the first stage 31 of the temporary-stacking section 30 is retracted downward as indicated by an arrow B by a cam mechanism, not shown, in interlocked relation with the rotational motion of the upper transport belts 37.

Then, the lower transport belts 36 are rotated by a motor, not shown, to advance the bundle of bills 20 and slip 6 to the outlet 27 whose shutter 50 is open, thereby presenting the bills 20 to the customer. When a predetermined period of time expires before the customer picks up the bundle of bills 20 and slip 6 from the outlet 27, the lower transport belts 36 are driven in the reverse direction while holding the bundle between belts 36 and the upper transport belts 37. As a result, the bundle of bills 20 is conveyed into the reject safe 34.

As described above, the illustrative embodiment of the present invention allows a slip 6 to be laid on the top of a stack of bills 20 without being redirected. This eliminates the need for an exclusive redirecting mechanism, thereby making it possible to implement a small size, inexpensive and reliable cash dispenser. Further, the slip 6 is presented to a customer face up without being turned over beforehand and, yet, surely fed onto the stack of bills 20.

Figure 14:
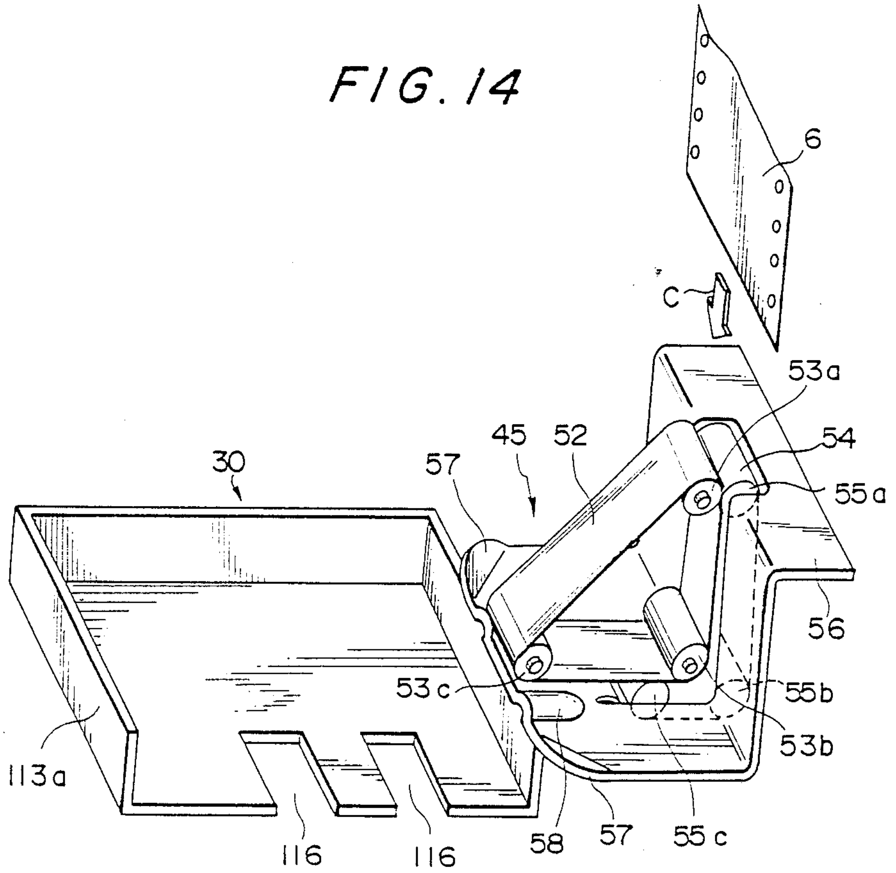
FIG. 14 is a perspective view showing an alternative embodiment of the present invention.
Figure 15:
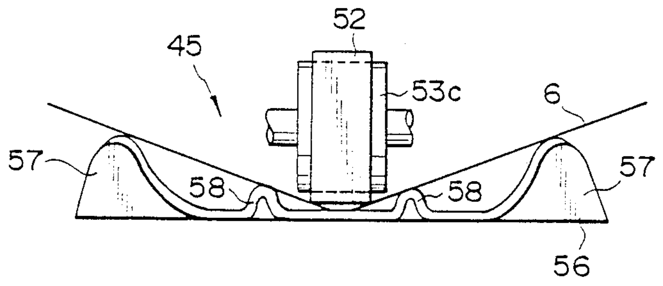
FIG. 15 is a fragmentary front view of the embodiment shown in FIG. 14.

Referring to FIGS. 14 and 15, a sheet ejecting mechanism in accordance with an alternative embodiment of the present invention is shown. In these figures, the transferring section 45 plays the role of a sheet receiving section and transfers an incoming sheet onto the temporary stacking section 30 from one side of and at an angle of substantially 90 degrees relative to the stacking section 30. In this particular embodiment, the slip 6 printed with details of an account is introduced into the transferring section 45 in a direction indicated by an arrow C.

As shown in the figures, the temporary-stacking section 30 of this embodiment is delimited by perpendicular walls at three of its sides so as to prevent the incoming slip 6 from slipping out of the stacking section 30. However, such an object is achievable even with a single wall 113a which faces the transferring section 45. The temporary-stacking section 30 is provided with recesses 116 for accommodating the transporting mechanism 38.

Figure 16:
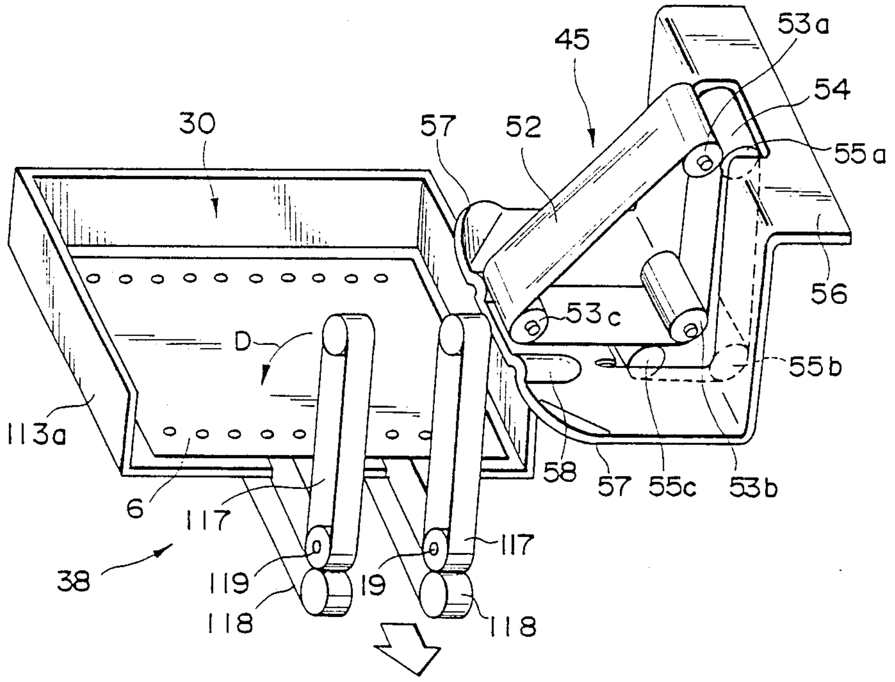
FIG. 16 is a perspective view showing a specific application of the embodiment of FIG. 14.
Figure 17:
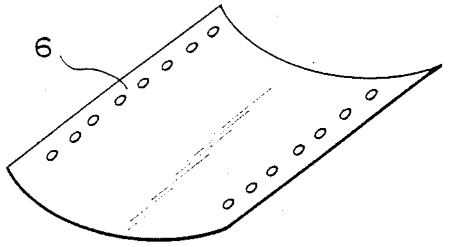
FIG. 17 is a perspective view of an example of a slip which is discharged by a disbursing mechanism in accordance with the embodiment of FIG. 14.

FIG. 16 is a perspective view showing a specific construction of the transporting mechanism 38 which is applicable to the temporary-stacking section 30 of FIGS. 14 and 15. In FIG. 16, the transporting mechanism 38 includes upper clamp belts 117 and lower clamp belts 118. The upper clamp belts 117 are rotatable about their pivots 119 as indicated by an arrow D to hold a sheet 6 between themselves and the associated lower clamp belts 118. In this condition, the lower clamp belts 118 are driven to in turn drive the sheet 6 out of the temporary-stacking section 30. Such a transporting mechanism 38 is essentially similar to the bundle transporting means 38 which has been discussed with reference to FIGS. 3 and 4, except that the sheet 6 is discharged in the opposite direction.

In operation, the transferring section 45 receiving the sheet 6 causes the upper transfer belt 52 and lower transfer belt 54 to hold and drive the sheet 6 toward the discharging end. At this instant, the belt 52 cooperate with the flight guides 57 to deform the sheet 6 generally in the form of a letter U at the instant when the sheet 6 is discharged. The sheet 6 is then discharged onto the temporary stacking section 30 which has no transporting means.

Figure 18:
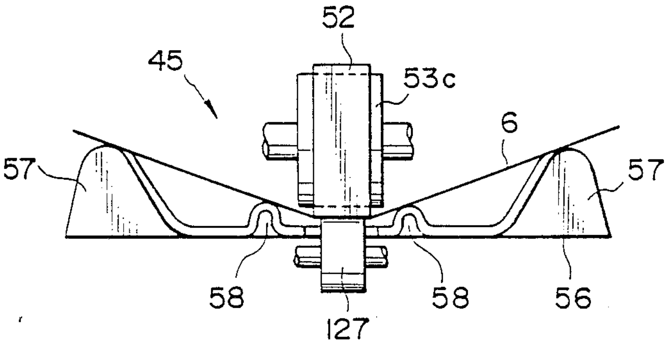
FIG. 18 is a fragmentary front view similar to FIG. 6, showing still another alternative embodiment of the present invention.

FIG. 18 is a fragmentary front view showing another alternative embodiment of the present invention. The construction shown in FIG. 18 is similar to the construction shown in FIG. 14 except that it additionally includes a transfer roller 127. It will be understood that the transfer roller 127 further enhances the positive discharge of the sheet 6.

Figure 19:
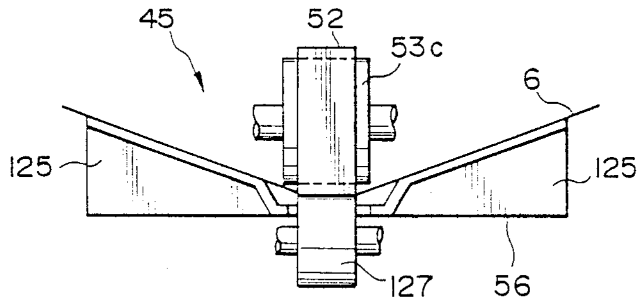
FIG. 19 is a fragmentary front view showing a further embodiment of the present invention.

Referring to FIG. 19, a further alternative embodiment of the present invention is shown in a fragmentary front view. In this particular embodiment, the protuberances 58 and flight guides 57 shown in FIG. 14 are contiguous with each other as indicated by the reference numeral 125. Such a contiguous or coplanar configuration insures a greater guiding effect, compared to the configuration of FIG. 14. In the embodiment of FIG. 19, consideration should be given to the fact that the sheet 6 is caused to be in sliding contact with the guide 56 over is entire area during the transfer to the temporary-stacking section 30 and, hence, the transferring direction is effected by the condition of contact, i.e., the application of this embodiment depends upon the dimensions of the sheet 6 as well as other factors.

In summary, in any of the embodiments shown and described, transferring means of a sheet discharging mchanism which includes belts and rollers is disposed on the center line with respect to an intended direction of sheet transfer, and sheet guides are located at both sides of the transporting means for deforming a sheet to be transferred generally into the form of a letter U. Such an arrangement gives resilience to a sheet and thereby causes the sheet itself to regulate the direction of discharge thereof. This simplifies the construction of a sheet storing section and thereby realizes an inexpensive and reliable sheet discharging mechanism while enhancing the freedom of processing which follows the sheet discharge operation.

While the present invention has been described with reference to particular illustrative embodiments, it is not to be restricted by those embodiments but only by the appended claims. It is to be appreciated that those skilled in the art could change or modify the disclosed embodiments without departing from the scope and spirit of the present invention.

What is claimed is:

1. A cash dispenser for dispensing bills in response to customer's operations, said dispenser including a disbursing mechanism comprising:

a bill outlet for producing bills from said dispenser;

temporary-stacking means for temporarily stacking bills to be dispensed and for positioning on the top of the bills a slip which is printed with particulars of an account, said temporary-stacking means including a first stage for stacking bills and a second stage located above said first stage for positioning a slip;

transferring means for delivering the printed slip onto said second stage from one side of and at an angle of substantially 90 degrees relative to said second stage; and bundle transporting means including lower transport belts interposed between said bill outlet and said temporary-stacking means and upper transport belts movable in a rotational motion relative to said lower transport belts;

whereby the bills and the slip are stacked on temporary-stacking means and then transported to said bill outlet while being held between said lower belts and said upper belts.

2. A cash dispenser in accordance with claim 1, wherein said transferring means comprises:

transporting means disposed on a center line of said transferring means with respect to an intended transferring direction and including belts and rollers for supporting said belts, said belts and said rollers cooperating to transfer the slip onto said second stage at a discharging end of said transporting means while holding said the slip;

said transporting means being provided with guide members at both sides of said discharging end for deforming the slip generally into the form of a letter U.

3. A cash dispenser in accordance with claim 1, wherein said lower transport belts of said bundle transporting means are located below said first stage and retractable to a further downward position;

said upper transport belts are held in sliding contact with an end portion of said lower transport belts adjacent to said bill outlet at one end of said upper transport belts and are positioned below said second stage at the other end of said upper transport belts and rotatable about said one end;

said upper transport belts are moved in a rotational motion by being interlocked with a downward movement of said lower transport belts to hold the bills and the slip stacked on said temporary stacking means in cooperation with said lower transport belts.

4. A cash dispenser in accordance with claim 2, wherein said transporting means comprises:

first and second belts defining a generally L-shaped discharging path for transferring the slip to said temporary-stacking means; and guide means for guiding the slip relative to opposite sides of said discharging path;

said guide means being provided with said guide members, and said guide members including protuberances positioned at opposite sides of a discharging end of said guide means and bent portions each being positioned outwardly of a respective one of said protuberances.

5. A cash dispenser in accordance with claim 4, wherein said transporting means includes a roller which is disposed at said discharging end and held in sliding contact with said first belt, whereby the slip is discharged to said temporary stacking means.

6. A cash dispenser in accordance with claim 4, wherein said protuberances and said bent portions of said guide members are individually formed as respective inclined surfaces.

7. A cash dispenser in accordance with claim 1, wherein said disbursing mechanism further comprises:

a safe for storing the bills to be dispensed;

feeding means for feeding the bills one by one from said safe; and transport path means for transporting the bills between said and said temporary-stacking means feeding means.

8. A cash dispenser in accordance with claim 7, wherein said disbursing mechanism further comprises:

a reject safe for storing bills which are detected to be defective and not to be dispensed; and discriminating means disposed on said transport path means for discriminating the bills fed by said feeding means out of said safe with respect to type, for checking the bills for defects, and for counting the bills which are free from defects.

* * * * *